United States Patent [19]

Alcorn et al.

[11] Patent Number: 5,995,121

[45] Date of Patent: Nov. 30, 1999

[54] MULTIPLE GRAPHICS PIPELINE INTEGRATION WITH A WINDOWING SYSTEM THROUGH THE USE OF A HIGH SPEED INTERCONNECT TO THE FRAME BUFFER

[75] Inventors: Byron A. Alcorn; Howard D. Stroyan; Randy L. Bailey, all of Fort Collins, Colo.

[73] Assignee: Hewlett-Packard Company, Palo Alto, Calif.

[21] Appl. No.: 08/951,356

[22] Filed: Oct. 16, 1997

[51] Int. Cl.[6] .............................. G06F 15/16; G06F 13/14
[52] U.S. Cl. ............................................ 345/520; 345/502
[58] Field of Search ..................................... 345/501, 503, 345/502, 512, 509, 507, 520, 521

[56] References Cited

U.S. PATENT DOCUMENTS

| | | | |
|---|---|---|---|
| 5,694,143 | 12/1997 | Fielder et al. ............................ | 345/112 |
| 5,790,134 | 8/1998 | Lentz ........................................ | 345/501 |
| 5,790,881 | 8/1998 | Nguyen .................................... | 345/503 |
| 5,821,940 | 10/1998 | Morgan et al. ......................... | 345/420 |
| 5,821,950 | 10/1998 | Rentschler et al. ..................... | 345/503 |

Primary Examiner—Kee M. Tung
Assistant Examiner—Sy D. Luu

[57] ABSTRACT

An improved method of incorporating a high performance graphics device into a base graphics subsystem of a processor includes two pairs of interface chips. One pair of interface chips is used to transfer pixel data between a base graphics system and the high performance graphics device, while the second pair of interface chips is used to transfer commands between the graphics device and the base graphics system. One of the pair of interface chips that is used to transfer pixel data is coupled to a bus within the base graphics subsystem while the second one of the pair is coupled to the graphics device. With such an arrangement, a high speed interface allows for pixel data to be fed directly to the frame buffer of the graphics subsystem, enabling the windows that are rendered by two different graphics systems to share a frame buffer memory.

18 Claims, 8 Drawing Sheets

MULTIPLE GRAPHICS PIPELINE INTEGRATION WITH A WINDOWING SYSTEM THROUGH THE USE OF A HIGH SPEED INTERCONNECT TO THE FRAME BUFFER

FIELD OF THE INVENTION

This invention relates in general to the field of computer graphics and more specifically to a method and apparatus for integrating external graphics processors into an existing graphics environment.

BACKGROUND OF THE INVENTION

Computer systems generally are sold with a specific number of base components. These base components typically include a host processor, a graphics subsystem, a display system and one or more external devices such as a disk drive. The base graphics subsystem of the computer system typically includes a graphics processor which may be dedicated to rendering picture element (pixel) data that is to be displayed on a display screen. The pixel data that is displayed on the display screen is stored in a frame buffer memory of the base graphics system in a digital pixel format. During operation, the contents of the frame buffer memory repeatedly are read out of the frame buffer and fed to a Random Access Memory Digital-to-Analog Converter (RAMDAC), which converts the digital pixel data into analog representations of the colors red, green and blue for display on a graphics device. The contents of the frame buffer are modified by the graphics processor to change images that are projected on the display screen.

Many applications may be executing at a given time on the computer system. Associated with each different application may be a unique window that displays the operative state of the application. For example, a given workstation may be executing a word processing application at the same time that it is executing a spreadsheet application, and each application will have associated therewith a different display window. As the user of the graphics workstation switches from application to application, the window associated with that application is displayed on top of the other displayed windows on the screen. Windows that are obscured by the top window may not save the pixel data that is hidden.

The base graphic system sold with the computer system usually provides certain basic graphics capabilities that allow an application to provide a general purpose display of two-dimensional objects. When a higher level of graphics capability is desired, for example, for executing applications that display high speed three dimensional images (such as those provided computer games flight simulators and the like), the user either must upgrade the graphics capabilities of his/her computer system by adding an additional high performance graphic device or, alternatively, must use software emulation techniques to provide the desired display.

There are a number of methods that are used to interface an additional high performance graphics device to an imaging system. One method is to directly connect the external graphics device to an external monitor. Another method that is commonly used to enable pixel data from two different graphics devices to be rendered on a common display is known as chroma keying. During chroma keying, pixel data from both of the frame buffers are forwarded as inputs to a multiplexer that is positioned after the respective RAMDACs. One color is selected as the "chroma key" and is used to control the select line of the multiplexer. When a pixel of the chroma key color is forwarded from the base graphics system, the multiplexer is switched to propagate data from the high performance graphics device in order to allow the high performance graphics device to provide a graphical display on the display screen. Similarly, when a pixel of the chroma color is forwarded from the high performance graphics system, the multiplexer is switched to propagate pixel data from the base graphics system, to allow the base graphics system to provide a graphical display on the display screen.

Although chroma keying is an effective technique for allowing windows generated by two different graphics devices to be displayed on a common display, the use of chroma keying introduces several drawbacks. One drawback is that the color value that is used as the chroma key is unavailable for use as a display color. A second drawback is that there are visual artifacts that are introduced during the transition from pixel data provided from the first frame buffer to the pixel data provided from the second frame buffer. Because the display screen may simultaneously display pixel data from two different frame buffers during the transition between frame buffers, visual artifacts that may blur an image are introduced. In addition, because separate frame buffers are included in each of the graphic devices, there is an increase in cost associated with the high performance graphics device.

Accordingly, it would be desirable to provide a technique for seamlessly integrating various windowing systems into a base graphics system without incurring visual artifacts, losing available colors, and increasing the cost of the overall system.

SUMMARY OF THE INVENTION

The present invention is directed to a method and apparatus for incorporating a high performance graphics device into a base graphics subsystem via the use of at least one interface chip. One interface chip may be coupled between a graphics processor and a frame buffer in the base graphics subsystem. The interface provides a datapath for pixel data, generated by the graphics device, to be forwarded and stored into the frame buffer memory of the base graphics system. In one embodiment, a second interface is provided within the graphics device, and the two interfaces communicate via a high speed data link to forward command data to and from the graphics device and to forward rendered pixel data to the graphics subsystem. With such an arrangement, a high speed interface allows for pixel data to be fed directly to the frame buffer of the graphics subsystem, allowing the windows that are rendered by two different graphics systems to share a frame buffer memory without incurring the visual artifacts and expense of prior art systems.

According to one aspect of the invention, a method for interfacing a graphics device to a graphics subsystem of a host processor is provided. The graphics subsystem includes a frame buffer memory for storing pixels to be fed for display to an attached display device. The method includes the steps of receiving, at a first interface coupled to the frame buffer memory of the graphics subsystem, pixel data generated by the graphics device, storing the pixel data generated by the graphics device in the frame buffer memory, and displaying the pixel data generated by the graphics device on the attached display device.

According to another aspect of the invention, a graphics subsystem including a graphics processor and a frame buffer memory includes a first bus interface coupled between the graphics processor and the frame buffer. The first bus interface is adapted to receive command and pixel data from the graphics device. The first bus interface includes means for propagating pixel data received from the base graphics processor and from the graphics device to the frame buffer.

According to another aspect of the invention, a workstation includes a host processor, and a graphics subsystem, coupled to the host processor. The graphics subsystem includes a graphics processor, a first interface, coupled to the graphics processor, and a frame buffer memory, coupled to the first interface. The host workstation further includes a graphics device, coupled to the first interface of the graphics subsystem. The graphics device further includes a graphics multi-processor, for generating pixel data for display on a display device of the workstation and second interface, for forwarding the pixel data from the graphics multi-processor to the first interface of the graphics subsystem, wherein the first interface forwards the pixel data received from the second interface to the frame buffer memory for storage.

BRIEF DESCRIPTION OF THE DRAWINGS

The above-mentioned and other features of the invention will now become more apparent by reference to the following description taken in connection with the accompanying drawings in which.

DETAILED DESCRIPTION OF ILLUSTRATIVE EMBODIMENTS

The present invention is directed to an improved method of incorporating a high performance graphics device into a base graphics subsystem of a processor via the use of a pair of interface chips. One of the pair of interface chips is coupled to the base graphics subsystem while the second one of the pair is coupled to the graphics device. The two interfaces communicate via a high speed data link to forward command data to and from the graphics device and to forward rendered pixel data to the graphics subsystem. With such an arrangement, a high speed interface allows for pixel data to be fed directly to the frame buffer of the graphics subsystem, enabling the windows that are rendered by two different graphics systems to share a frame buffer memory. The concepts of the present invention will now be described with reference to the attached drawings, where like numbers refer to like elements in the drawings.

Figure 1:
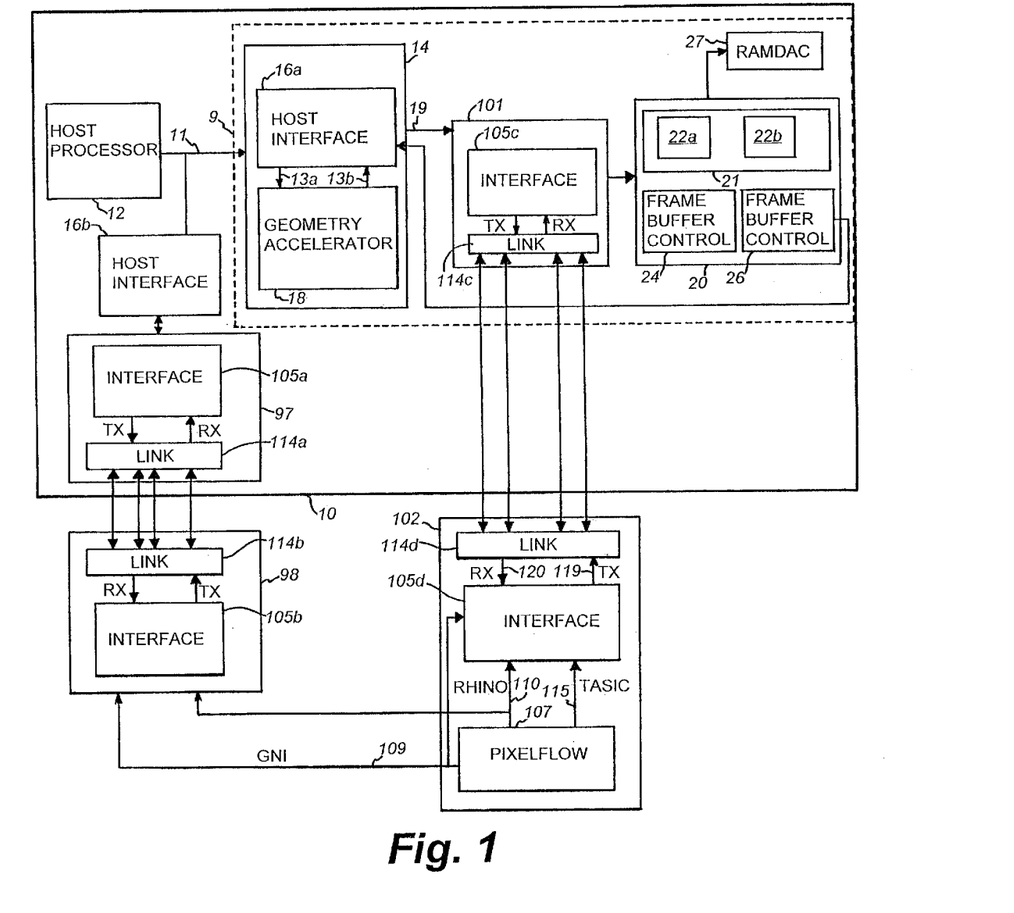
FIG. 1 is a block diagram of a host workstation including a graphics subsystem employing the present invention.

FIG. 1 is a block diagram showing an exemplary workstation 10 including a host processor 12 and a base graphics subsystem 9 in which the interface of the present invention can be employed. Graphics subsystem 9 includes a front end subsystem 14 and a frame buffer subsystem 20. Front end subsystem 14 includes a host interface 16a and a geometry accelerator 18. Host interface 16a receives the x, y, z vertex coordinates and color primitive data over bus 11 from host processor 12, and forwards them to geometry accelerator 18 via bus 13a. Geometry accelerator 18 performs conventional geometry accelerator functions, such as three-dimensional transformations, lighting, clipping, and perspective divide operations, as well as generating edge equations in floating point format, and returns pixel coordinate and vertex data to host interface 16a via bus 13b. In systems where a geometry accelerator is not provided, the edge equations may be alternatively provided by the host processor.

When the graphics subsystem is operating using pixel data from the front end subsystem 14, the edge equations are forwarded to frame buffer subsystem 20, which includes rasterizing logic for transforming the edge equation and vertice data into discrete pixel coordinate and color data for storage in coupled frame buffer memory 21. In the graphics subsystem shown in FIG. 1, frame buffer subsystem 20 includes two frame buffer controllers 24 and 26, each of which controls the display of one portion (22A and 22B, respectively) of frame buffer memory 21. Frame buffer controller 24 controls the contents and display of data in portion 22A of the frame buffer memory, and frame buffer controller 26 controls the contents and display of data in portion 22B of frame buffer memory 22A and 22B. The pixel data is read from the frame buffer memory and forwarded to RAMDAC 27. RAMDAC 27 translates the digital pixel data into analog Red, Green and Blue color signals for controlling a display screen (not shown). Although the below description references a typical color display device, the invention is not limited to any particular type of display device, and other devices (e.g., digital, monochromatic or gray scale) may alternatively be used.

According to one embodiment of the invention, disposed between front end subsystem 14 and frame buffer subsystem 20 is an external graphics interface 101. External graphics interface 101 includes an interface chip 105c coupled to a link 114c. External graphics interface 101 is coupled to front end subsystem 14 and frame buffer subsystem 20 via bus structure 19. Bus structure 19 couples the external graphics interface and the frame buffer logic to the host processor may be a high performance bus structure such as that described in U.S. patent application Ser. No. 08/847,271, entitled "High Speed Interconnect Bus" by Faget et. al., (attorney docket number 10961013-1), filed May 1, 1997 and incorporated herein by reference. Bus structure 19, in one embodiment, is a ring-based bus structure that originates and terminates at host interface 16a. Data is passed over the bus structure in a packet format, including an address, command and data portion. With the exception of the host interface chip, each of the components coupled to the bus examines the address of the data as it flows through the component, and only retrieves commands and data that are relevant to the component. The address, command and data propagate through the component in roughly one data transfer cycle. Because each of the components is linked to only one other component in the ring, the loading on each of the segments of the bus is minimized, thereby allowing for a high speed interconnect to be provided between components. In addition, due to the ring bus structure, additional components may be added without affecting the overall performance of the system since the only delay that is introduced is the time required to propagate data through the component; roughly one data transfer cycle.

Because interface 101 is coupled to a bus structure that allows for high performance data transfer rates that are largely unaffected by the addition of components to graphics subsystem 9, interface 101 may be used to retrieve data from any external device (such as external graphics device 102), having a high performance data throughput, for use in the existing graphics subsystem 9. One advantage of coupling high performance external graphics device 102 to an existing graphics subsystem is that a high performance graphics alternative is made available to the workstation while minimizing the impact on the performance of graphics subsystem 9.

A number of advantages are achieved by interfacing external graphics devices to the graphics subsystem in this manner. For example, because the interface is disposed upstream of the frame buffer, pixel data from both graphics subsystem 9 and external graphics device 102 may be stored in shared frame buffer subsystem 20. As a result, the merging of pixel data from each of the graphics subsystems may be performed within the interface, before the data it is written to frame buffer memory. As such, no visual artifacts are incurred when switching between graphics applications executed on the two different graphics systems and a seamless integration of different windowing systems is provided. In addition, because only one frame buffer/RAMDAC pair is needed to support the multiple windowing systems, digital chroma keying techniques are not required.

According to one embodiment of the invention, external graphics device 102 is a high performance graphics device for processing graphics applications that demand high performance, quality image rendering. Graphics applications such as flight and vehicle simulation, computer-aided design and virtual reality demand high-quality rendering, high polygon rates, and high frame rates. Existing commercial graphics systems, such as graphics system 9, render at peak rates up to two million polygons per second. If anti-aliasing or realistic shading or texturing is required, however, the performance of the existing graphics systems is degraded.

Accordingly, when it is desired to use workstation 10 to execute high performance graphics applications, an auxiliary graphics system, such as graphics device 102, is coupled to workstation 10 via interfaces 105a–105d. Interfaces 105a and 105b are coupled between host interface 16b and the high performance graphics device 107 for transferring host commands and control data between the graphics device 102 and the host processor 12. Host interface 16b is identical to host interface 16a. Interfaces 105c and 105d are coupled between the data bus 19 of the base graphics subsystem and the high performance graphics device 102 for transferring pixel data between the graphics device 102 and the frame buffer subsystem 20. Accordingly, interfaces 105a and 105b together comprise a host command interface to the graphics device 102, while interfaces 105c and 105d together comprise a data interface to the graphics device 102. Interfaces 105a–105d are structurally identical; however, different inputs of the interfaces are utilized depending upon the function that the interface is intended to serve; i.e., as a host command interface or as a data interface.

According to one embodiment, graphics device 102 uses an image composition architecture having a graphics multi-processor including a number of independent processors. Each of the processors renders individual primitives and the results from the rendering process are combined according to a static priority scheme. One example of an image composition architecture that may be implemented in graphics device 102 is a PIXEL FLOW architecture. The PIXEL FLOW architecture is a high-speed rendering image composition architecture developed by the Department of Computer Science at the University of North Carolina, Chapel Hill, N.C., as described in *PixelFlow: High-Speed Rendering Using Image Composition,* Computer Graphics vol. 26, July 1992, pp 231–239.

Figure 2:
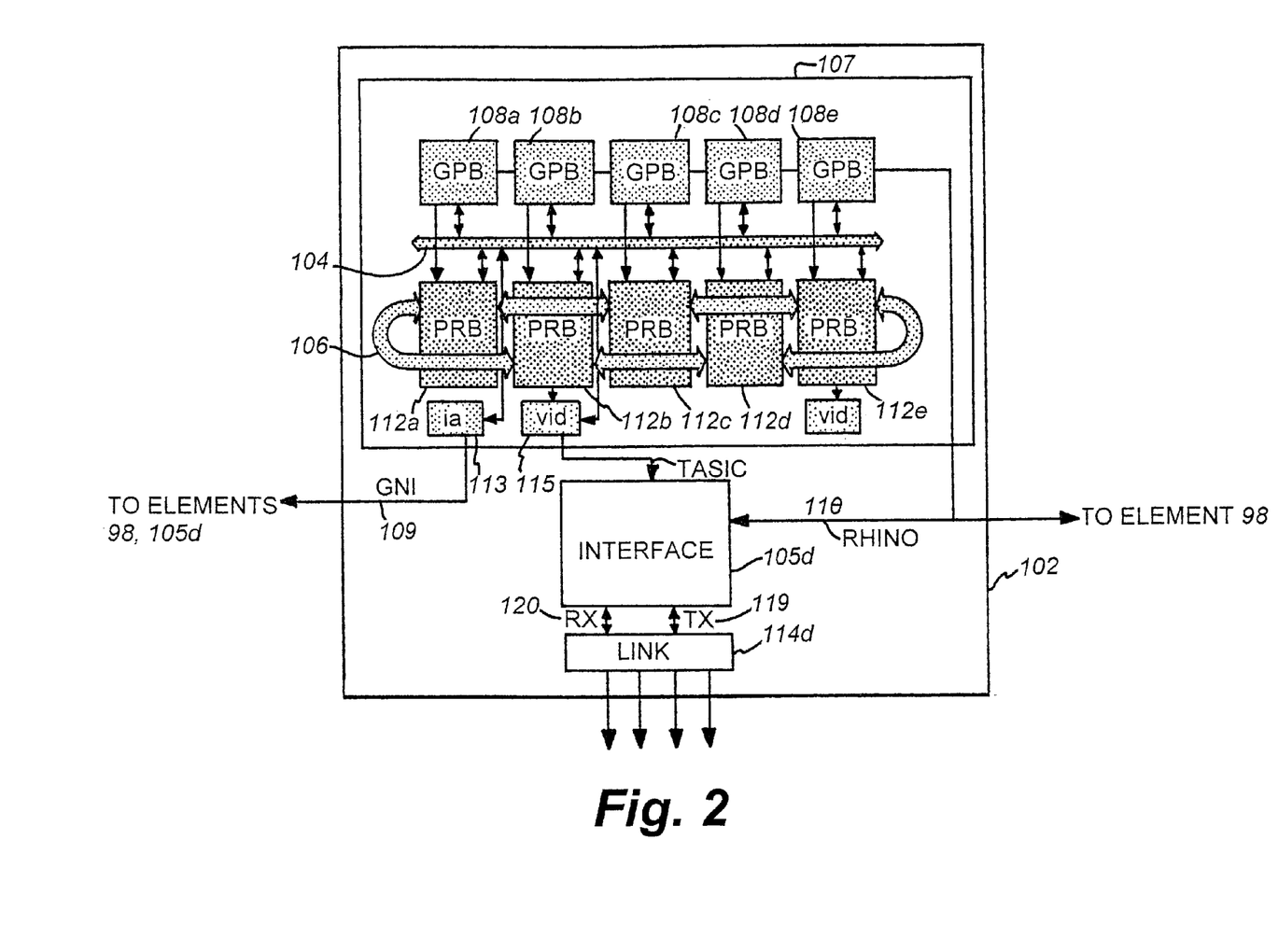
FIG. 2 is a high level block diagram of a high performance graphics multi-processor to be used in conjunction with the graphics subsystem of FIG. 1.

Referring now to FIG. 2, one embodiment of a graphics multi-processor 107 that uses a PIXEL FLOW architecture is shown. Each PIXEL FLOW multi-processor 107 includes up to 16 processor board pairs (although only five pairs are shown in FIG. 2), each pair including a geometry processor board (GPB) such as GPB 108a and a pixel flow rasterizer board (PRB) such as PRB 112a. Each geometry processor board 108a–e receives a distributed display list from host processor 12 via GeNIe bus 109. The distributed display list may include, for example, commands for generating graphics images on a display device. Each geometry processor board 108a–e uses the commands on the display list to issue rendering instructions to an associated one of the pixel flow rasterizer boards 112a–e. All of the pixel flow rasterizer boards 112a–e work together to render screen images at a sub-pixel resolution.

Each pixel flow rasterizer board 112a–e may include a parallel array of pixel processors, each processor including a memory. The pixel flow rasterizer boards 112a–e are connected together via an image composition network bus 106. For each region in a screen, pixel flow rasterizer boards 112a–e render associated primitives into discrete pixels and image composition network 106 combines the results from each of the pixel flow rasterizer boards with a Z buffer composite at a subpixel resolution. Providing pixels at a sub-pixel resolution allows for enhanced anti-aliasing and texturing to be provided.

Coupled between pixel flow rasterizer boards 112a–112e and GPBs 108a–108e is a geometry network 104. Geometry network 104 is a packet based network that is used to forward commands and data between any of the coupled devices 112a–112e and 108a–108e. As mentioned above, the geometry network may also be coupled to an interface, such as interface 113, for exchanging commands and control between elements within graphics device 102 and external devices such as host workstation 10.

Each of pixel flow rasterizer boards 112a–e includes adapter slots for a geometry network interface and a video interface. An Input/Output (I/O) interface, such as interface 113, may be coupled to a geometry network 104 via the geometry network adapter slot in the pixel flow rasterizer board. A video interface, such as video interface 115, may be coupled to pixel flow rasterizer board 106 via the video adapter slot in the pixel flow rasterizer board. Accordingly, I/O interface 113 may be used to couple external I/O devices such as an Small Computer System Interconnect (SCSI) disk drive or an interface such as interface 105b to geometry network 104. Video interface 115 provides a datapath for transferring rendered pixel data from pixel flow multi-processor 107 to an attached device.

As mentioned above, in one embodiment, adapter 113 is coupled to the geometry network 104 to provide a bi-directional interface between the geometry network and the workstation 10 via bus 109. The I/O adapter generally comprises a set of clocked differential drivers and receivers that extend the geometry network to interface 105b (FIG. 1) via bus 109. Adapter 113 is also used to transfer pixel data on Tasic bus from pixel flow rasterizer boards 112a–e to host workstation 10 via interface 105d. Interfaces 105b and 105d are also coupled to a Rhino processor bus 110 that connects geometry processing boards 108a–e. The connection to the Rhino processor bus 110 provides a command datapath for forwarding startup data between host workstation 10 via interface 105b.

Thus, interface 105d, is coupled to graphics multi-processor 107, receives pixel data from the pixel flow rasterizer boards on Tasis bus, and receives initialization data is received on bus 110. Interface 105d provides output on transmit bus 119 to link 114d, and receives input on receive bus 120 from link 114d.

Link 114d is structurally identical to links 114a–114c. Each link encodes 32 bits of parallel data (received from either the geometry network, the video bus or the internal geometry processor bus via transmit bus 119) into four serial streams. The serial streams are coupled capacitively onto four coaxial cables for transmission to interface 105a in graphics subsystem 109. The links are also capable of receiving and converting the four serial streams into a single 32-bit stream. One link part capable of performing the above tasks is the VSC7214 Quad Backplane Interconnect Chip (QuBIC), manufactured by Vitesse. In one embodiment, the link provides full duplex operation (32 bits in both the transmit and receive directions). However, communication originating at the host interface 16b that is forwarded through interface 105a to interface 105b an ultimately onto geometry network (GNI) bus 109 for the graphics device 102 may be handled using only one coaxial connection, since only eight bits are necessary for forwarding control, and since no pixel data is forwarded in this direction.

Referring back again to FIG. 1, it can be seen that interfaces 105a–105d allow for an image composition system, designed according to the pixel flow architecture, to be incorporated into a base graphics subsystem, having the ring bus structure described above, without compromising the performance of the graphics subsystem. As described above, the graphics device is a physically separate device that is connected to a workstation via several high speed data links, although the invention is not so limited. The work station supplies the graphics device with the display list for a window via host interfaces 105a and 105b, and the graphics device returns the pixels of the resultant images for the window to the work station for storage in frame buffer subsystem 20 via pixel interfaces 105c and 105d. Thus, the interface is capable of operating in either a Host Interface (HIF) mode or piXel InterFace (XIF) mode. The operation of the interfaces as host interfaces and pixel interfaces is described in detail below.

Host Interface Operation

In order to understand the method used by graphics device 102 for communicating with the host processor 12, the operation and bus structure of graphics device 102 will first be described in detail.

Figure 3:
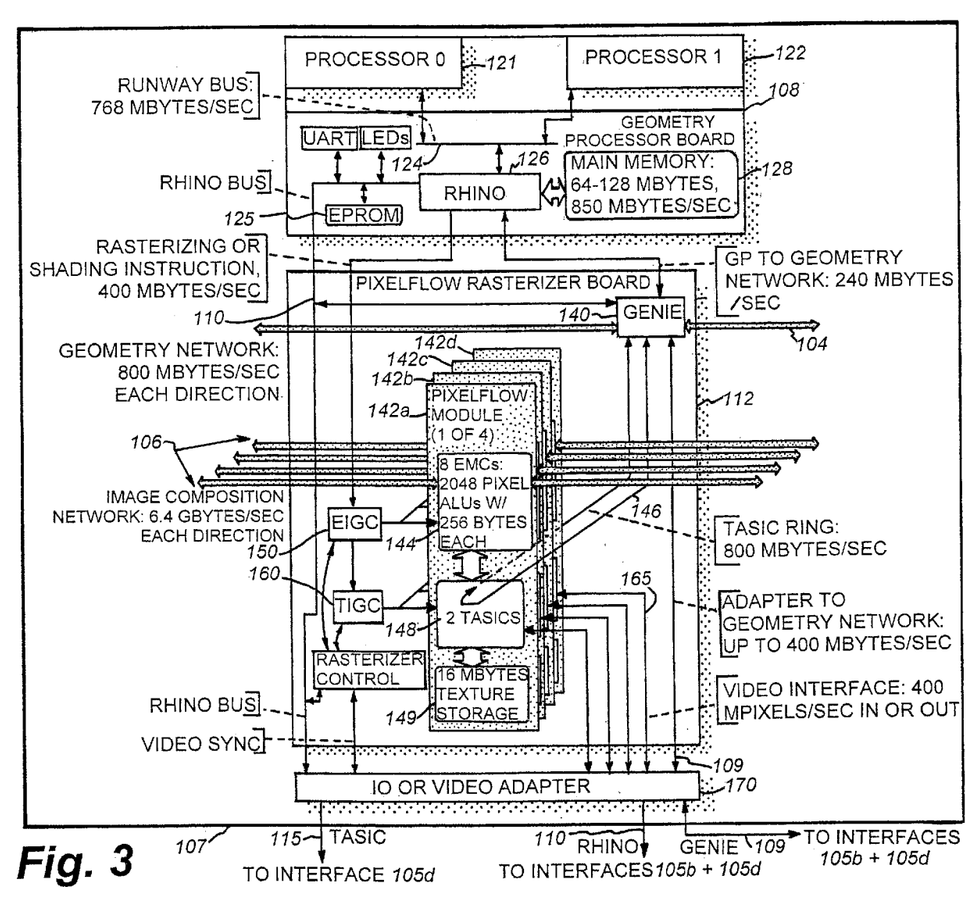
FIG. 3 a detailed block diagram of a graphics device incorporating the graphics multiprocessor of FIG. 2.

Referring now to FIG. 3, a detailed block diagram of graphics device 102, illustrating the communication links provided between graphics multi-processor 107 and interfaces 105b and 105d is shown. As mentioned above, geometry processor boards 108a–e provide the functionality required for display list traversal, geometric processing, and generation and rendering instructions. In the embodiment of FIG. 3, an exemplary one of the geometry processing boards 108a is shown as including two processors, processor 121 and processor 122. Each of the processors is capable of performing floating point multiply accumulate and integer operations. The processors include instruction and data caches. The two processors, processors 121 and processor 122 are coupled via bus 124 to a bus interface 126. Bus interface 126 controls the arbitration between the processors 121 and 122 for bus 124 and additionally manages the cache coherence protocol for memory read and write operations. Coupled to bus interface 126 is a main memory 128. Also coupled to bus interface 126 is a geometry processing bus 110. Geometry processing bus 110 provides read and write access to a boot Eraseable Programmable Read Only Memory (EPROM) 125 and to status and control registers (not shown) for geometry processor board 108 and pixel flow rasterizer board pair 112. EPROM 125 is a 256 kilobyte or larger flash memory device. The lowest level boot code (i.e., the code for initializing graphics device 102) is in a write-protected sector of the EPROM. Accordingly, at power up, the code within the EPROM is used to initialize graphics device 102.

As mentioned above, geometry network 109 is a packet-routing network coupled to a geometry network interface (GeNIe) chip 140 on the rasterizer board. A GeNIe chip 140 is provided on each of the pixel flow rasterizer boards in graphics device 102. Messages are transmitted in packets of up to 2 kilobytes, which are stored and forwarded by the GeNIe chips 140 at each of the pixel flow rasterizer boards. Each GeNIe chip 140 provides three ports to the geometry network for each geometry processing/pixel flow rasterizer board pair. One port is coupled to a graphics network interface at the geometry processing bus interface 126. A second port is coupled to an adapter interface 170. A third port is coupled to an array of pixel processors 142 on pixel flow rasterizer board 112. Thus, the geometry network can route images from any port on any geometry network chip to any other port on any other geometry network chip within the graphics device (when there are multiple pairs of geometry processing boards and pixel flow rasterizer boards included in the system). In addition, transmissions from port to port within a geometry network interface chip are allowed (for example, transmissions from the texture processing ring to adapter interface 170). Packets may be directed at individual GeNIe chips 140, or alternatively may be broadcast to multiple GeNIe chips 140 in the graphics device.

Pixel flow rasterizer board 112 comprises an array of pixel processors 142, where pixel processors 142a through 142d are illustrated in FIG. 3. The array of processors 142 is arranged to cover various size regions of pixels depending on the number of processors required to process each pixel, where a region is an area of the window that is to be displayed and is identified by the number of pixels in the rows and columns of the region. For example, for a region within the window of 32×32 pixels, the number of processors allocated for processing each pixel is eight. For a region size of 32×64, the number of processors allocated for processing each pixel is four. For a region size of 64×128, the number of processors allocated for processing each pixel is one.

Each of the processors, such as processor 142a, includes a byte-wide arithmetic logic unit (ALU), 256 bytes of pixel memory, a pair of 32-byte buffers connected to a texture memory system 149 and a pair of 32-byte buffers connected to the image composition network 106. The pixel processors are controlled in a symmetric fashion by the Enhanced Memory Chips Image Generation Controller (EIGC) 150. The EIGC receives an instruction stream from a Direct Memory Access (DMA) controller in interface 126. Example instructions implemented by the EIGC include an enable all pixels instruction, a disable pixel instruction, add and multiply instructions.

Figure 4:
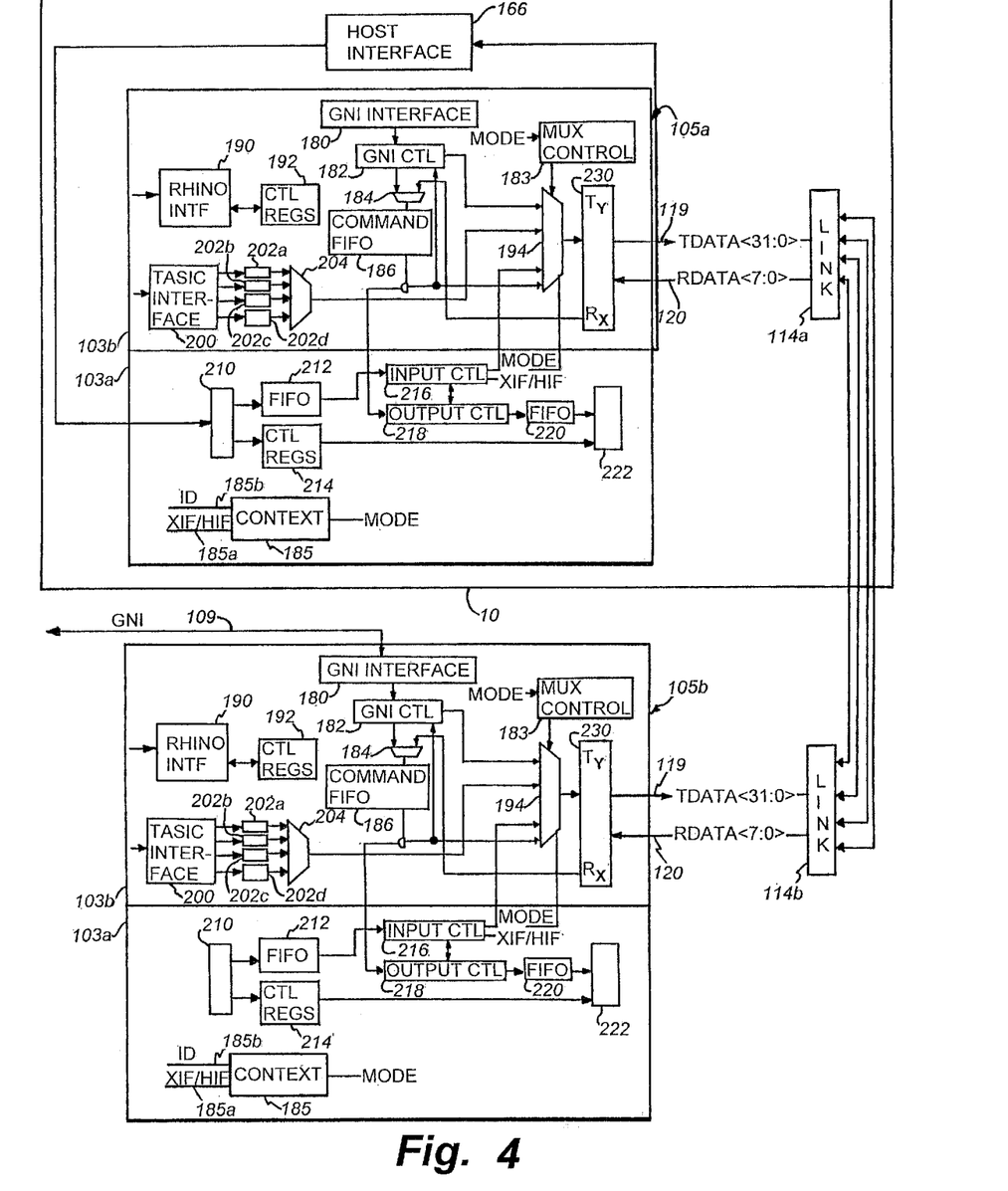
FIG. 4 is a block diagram of a host interface for use in the host workstation of FIG. 1.

Thus, the graphics device 102 is coupled to exchange command and control information with the host CPU 12 via the GeNIe bus 109, and initialization information via the processor bus 110. Referring now to FIG. 4, a block diagram of the host interface logic including is shown to include interface 105a coupled to exchange data with host interface 16b. Interface 105a (which is structurally identical to interfaces 105b–105d) is shown in more detail to be apportioned into two discrete interface portions 103a and 103b. The first interface portion 103b is an interface that is used to provide a datapath between the busses of the graphics device 102 and an external device (such as the host processor 12). The second interface portion 103a is an interface that is used to transmit data onto the bus 19 of the graphics subsystem 9 (FIG. 1). Both of the discrete interface portions 103a and 103b are capable of receiving and transmitting data on Rx bus 120 and Tx bus 119, respectively. Although in the embodiment of FIG. 4 both interface portions 103a and 103b are shown included and described in one logical unit, the invention is not so limited. It is envisioned that both discrete portions 103a and 103b could be implemented in separate physical chip devices. However, implementing them in one device as described herein advantageously allows for sharing of hardware structures and allows for the manufacture of only one device having multiple functional capabilities.

The interfaces 105a–105d may operate in either a Host Interface mode (HIF) or a piXel InterFace mode (XIF). In HIF mode, command packets and display lists are transferred between graphics device 102 and host interface 16b (FIG. 1). In XIF mode, pixel data is provided from pixel processors 142 within graphics device 102 to the frame buffer system 20 of the graphics subsystem 9. Generally speaking, command packets may be transferred in either direction in HIF mode, whereas typically pixel data is transferred in the direction of the graphics device to the graphics subsystem in XIF mode, while eight bits of flow control may be transferred from the graphics subsystem to the graphics device in XIF mode.

Context logic 185 provides a mode signal indicating a state of operation of the interface 105a–105d. The inputs to context logic 185 include an ID bit 185a and a XIF/HIF bit 185b. The ID bit 185a identifies the interface as one of the four possible interfaces (105a–105d). The ID bit may be provided by a hardwired pin external to the interface or alternatively may be set via a register write operation. The XIF/HIF bit is set by a register write over geometry network interface 109, where the destination of the write is one of the interfaces 105a–105d. The ID and XIF/HIF signals are processed by context logic 185 to provide a MODE signal which is forwarded to a multiplexer control unit 183 for selecting the flow-through path of multiplexer 194.

The discrete portion 103b of the interface includes a Rhino processor bus interface 190, a Tasic pixel processor bus interface 200, and a GeNIe bus interface 180. The discrete portion 103a of the interface includes a graphics system bus input register 210 and a graphics system bus output register. Shared by both the discrete portion 103a and the discrete portion 103b is the transmit/receive interface 230.

Rhino processor bus interface 190 receives data and commands for writing to control registers 192. Control registers 192 indicate the current status of processing in the coupled graphics device 102. Control registers 192 may therefore be used to interpret the command information that is received on geometry network bus 109 regarding the status and operating conditions of pixel flow multi-processor 107.

GeNIe interface 180 transmits and receives commands and control data on geometry network bus 109 when operating in host interface mode. Coupled to geometry network interface 180 is a geometry network control unit 182. Geometry network control unit 182 stores and controls the distribution of commands that are forwarded between pixel flow multi-processor 107 and a coupled host workstation, such as workstation 10. Accordingly, geometry network control unit 182 is a bi-directional control interface that provides a communication link between the host workstation and pixel flow multi-processor 107. As will be described in more detail below, commands are forwarded to geometry network control unit 182 either from geometry network interface 180 or alternatively from the receive data path in transmit/receive interface 230.

Figure 5A:
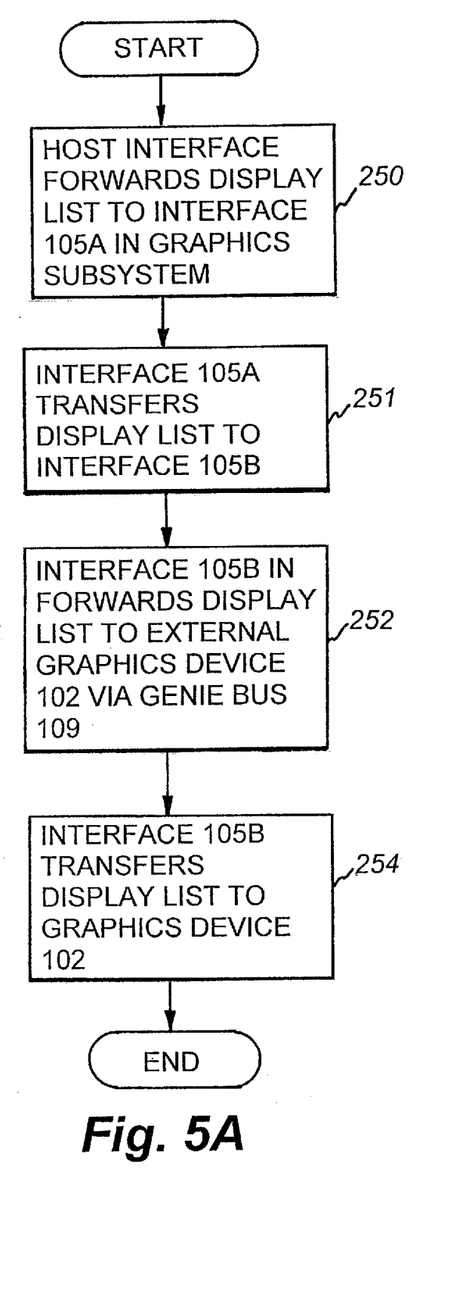
FIGS. 5A and 5B are flow diagrams illustrating the data flow communication paths for operating the host interface of FIG. 4.
Figure 5B:
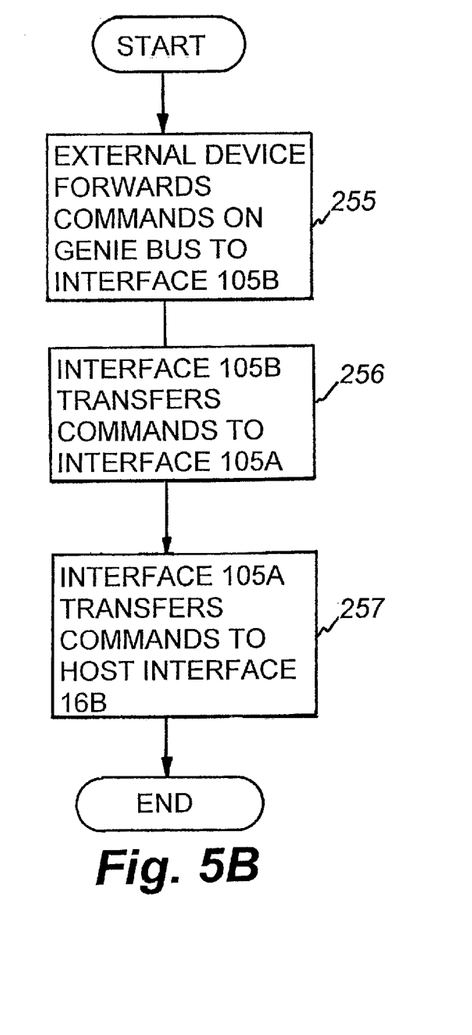

Referring now to flow diagrams 5A and 5B, the operation of the pair of interfaces 105a and 105b in host interface mode will now be described referring to elements in FIG. 4. Referring now to FIG. 5A, when the host processor desires to send a command, such as a display list, to the external graphics device, at step 250, the host CPU forwards display list information to interface 105a. As described above, the display list is a list of graphics commands for generating images to be rendered on the display screen. Each entry in the list may include an identifier, identifying the graphical structure, and a location within the display at which the graphical structure is to be located. The location within the display may generally include a window identifier, identifying the window that is associated with the graphical structures in the display list.

At step 252, interface 105a forwards a display list to interface 105b. In particular, with reference now to FIG. 4, the display list is received via interface 210 from host interface 16b, and stored in command FIFO 212. The address associated with the display list is the address of the external graphics device. The display list is then forwarded in 32 bit segments through multiplexer 194 for storage in transmit register 230. As described above, the transmit register 230 then transfers the data and commands to link 114a, which converts the parallel bitstream into four serial bitstreams for transfer on a coaxial cable to link 114b in interface 105b.

At step 254, interface 105b transfers the display list to the graphics device 102 as follows. The display list is converted from the four serial bitstreams to a 32 bit data stream and stored in transmit/receive register 230. The contents of the transmit/receive register 230 in interface 105b are then forwarded to the command FIFO 186 of interface 105b. When the command FIFO 186 is either full or has the complete display list, it forwards the list to the GeNIe control unit 182 and stores it at the GeNIe interface 180. The display list is subsequently forwarded out of the GeNIe interface 180 to the external graphics device 102 on GeNIe bus 109 for processing.

In one embodiment, the commands and data in the display list may be transferred to the graphics device using a Direct Memory Access (DMA) protocol. The DMA protocol operates generally by forwarding a DMA command to the external graphics interface indicating that a DMA operation is to be executed, and the size of the data that is to be transferred during the DMA operation. Other data transfer techniques alternatively may be used. Once all of the data from the display list has been transferred to graphics device 102, graphics device 102 may initiate processing of the display list.

Referring now to FIG. 5B, the external device 102 issues various register write operations to the host processor for establishing a configuration of the windowing environment of the external graphics device. Therefore, at step 255, the external device issues the commands and data on bus 109 to the interface 105b. The data retrieved from the interface is temporarily stored in command FIFO 186 of interface 105b. At step 256, the commands are forwarded to the transmit/receive register 230, and forwarded from link 114b to link 114a. The link 114a converts the serial bitstream into parallel, and stores the commands in the command FIFO 186 of the interface 105a. At step 257, the commands are forwarded from command FIFO 186 to output control block 218 and output FIFO 220 to the host interface 16b.

Pixel Interface Operation

Figure 6:
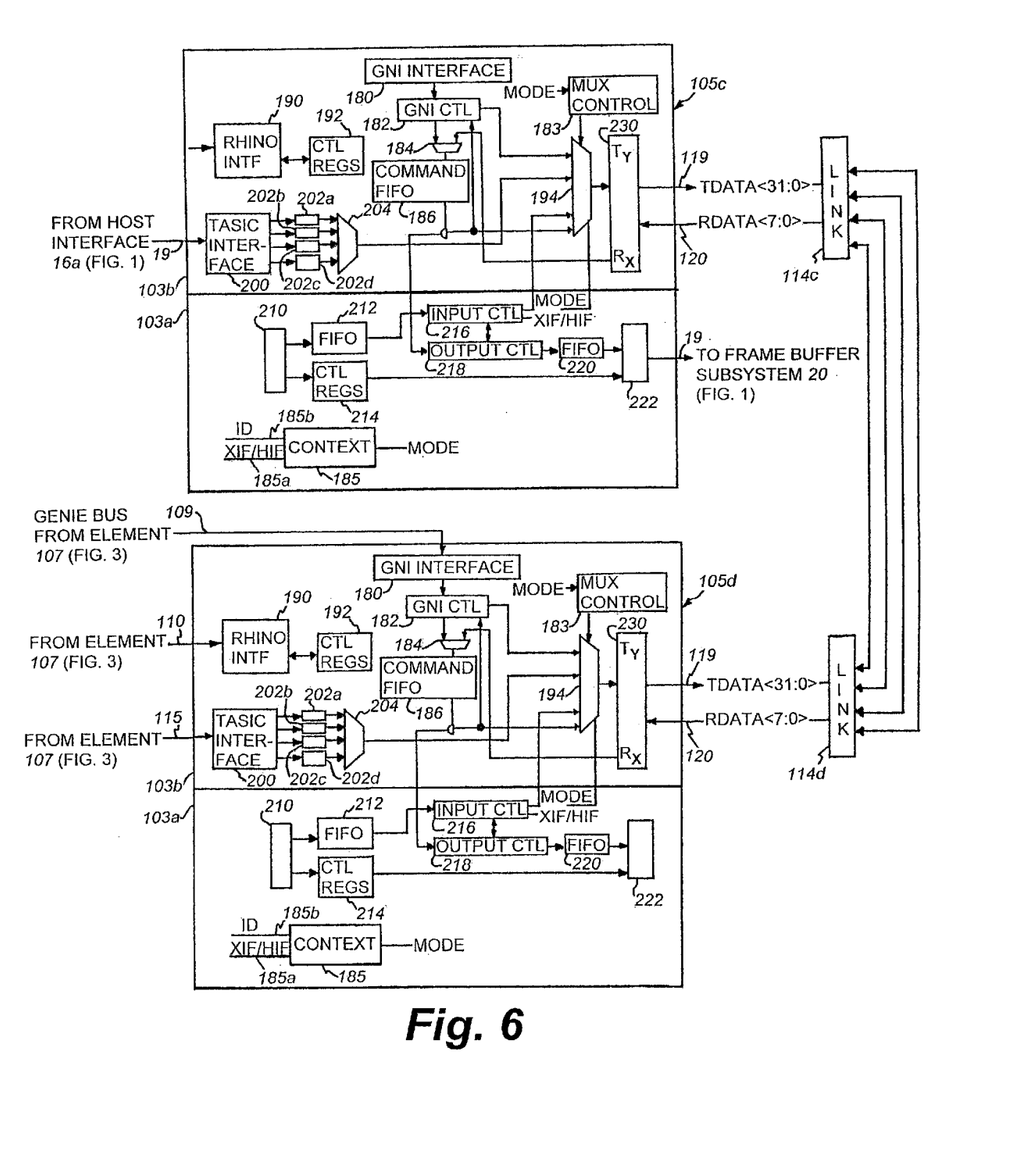
FIG. 6 is a block diagram of a pixel interface for use in the host workstation of FIG. 1.

As described above with regard to FIG. 3, there are two main connections between graphics device 102 and interface 105d, including a connection to the pixel processors via Tasic bus 115 and a direct connection to Rhino processing bus 110 and GeNIE bus 109. Referring now to FIG. 6, the operation of the interfaces 105c and 105d in pixel mode for transferring pixel data from the high performance external graphics device to the frame buffer subsystem 20 of the graphics subsystem 9 will now be described.

Pixel processor interface 200 receives video and textured pixel data from pixel flow multi-processor 107 via bus 115. The pixel data is generally in the form of a tile, which comprises a predetermined number of pixels. Pixel processor interface 200 retrieves data from the pixel processors, orders it if needed, stores it in coupled FIFOs 202a–202d, and then passes it to transmit/receive register 230 for transmission to the interface 105a in host workstation via link 114d. The length of the pixel data sent to the host workstation is retained at the interface, and the transfer of data from FIFOs 202a–202d is halted when all the data from the tile has been read.

Link 114c in the graphics subsystem 9 translates the serial data received from interface 105d into a parallel bitstream, and temporarily stores in the command FIFO 186. Data from command FIFO 186 is then forwarded to output control logic 218, FIFO 220 and to graphics bus output register 222 to the downstream components on bus 19. With such an arrangement, the pixel flow graphics device may directly access frame buffer subsystem 20 (FIG. 1) for pixel read and write operations. Because the pixel data from graphics device 102 is merged with the pixel data from graphics subsystem 9 before accessing frame buffer subsystem 20, the visual artifacts encountered in the prior art when combining pixel data from two different sources is eliminated. Techniques such as chroma keying, which decrease the number of operative colors that may be provided in the system, need not be utilized because only one stream of pixels is forwarded from the shared frame buffer subsystem to the RAMDAC. In addition, sharing the frame buffer between two or more windowing systems reduces the amount of memory that needs to be provided in any coupled graphics device since the same frame buffer memory may be shared between any number of additional graphics devices and the graphics subsystem.

Figure 7:
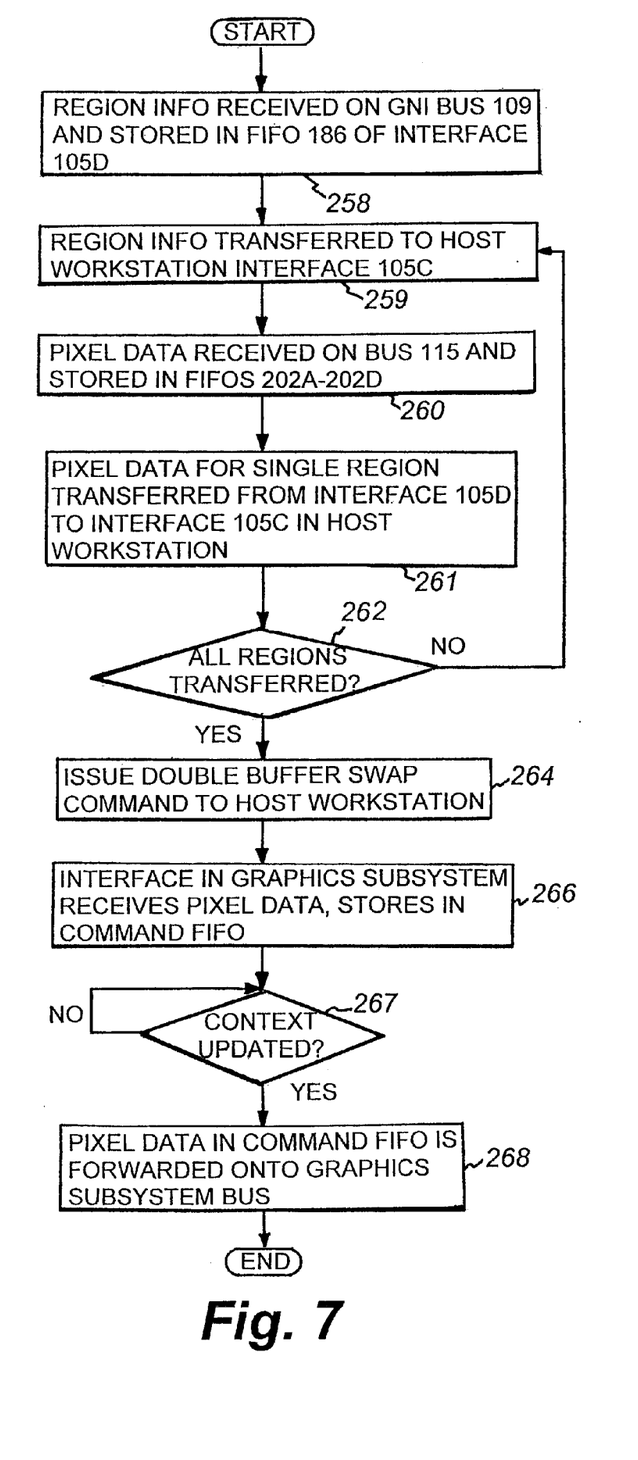
FIG. 7 is a flow diagram illustrating the data flow paths for operating the pixel interface of FIG. 6.

Referring now to FIG. 7, at step 258 region data for the image that is to be transmitted to the host workstation is received from the pixel multi-processors 107 either the GeNIe bus 109 or the Rhino processor bus 110 and stored in the command FIFO 186. At step 259, data for one region is forwarded from the command FIFO 186 to the interface 105c in the host workstation. Region configuration data may include such information as: context ID (identifying which application the windowing data is intended for), region origin (identifying the origin within the window pixel coordinates for which the pixel data is destined), region extent (identifying the size of the region of the window that is to be modified) and possibly other information, such as current eye (i.e., the depth of the region, in Z plane coordinates) and pixel format (identifying how the pixels that are forwarded are to be interpreted). At step 260, pixel data for a given region is transferred from pixel processors 142a–142d in pixel flow rasterizer boards 112a–112e to the pixel processor interface 200 of interface 105b and is stored in FIFOs 202a–202d. Once the region configuration data for the region has been transferred to the host workstation, at step 261, the pixel data that was stored in FIFOs 202a–202d is forwarded through multiplexer 194 to transmit/receive register 230 and subsequently to interface 105c in the host workstation. At step 262, a check is made to determine whether all of the regions associated with the display list have been transferred to the workstation 10. If not, then the process re-executes steps 259 though 261 until it is determined, at step 262 that all of the regions have been transferred. Once all of the regions have been transferred, at step 264 geometry processor board 108 in pixel multi-processor 107 issues a double buffer swap command from command FIFO 186 to the interface 102. The effects of the double buffer swap command on graphics subsystem 9 are described in more detail below, however one effect of the double buffer swap command is to change the context of the ownership of the frame buffer to the external graphics device.

At step 266, interface 105c in graphics subsystem 9 receives the pixel data from interface 105d in graphics device 102 and stores the data in transmit/receive register 230. As the pixel data is received, it is forwarded to and stored in command FIFO 186. At step 267, the context of ownership of the frame buffer is checked. If the context has not yet been changed to reflect that the external graphics device owns the frame buffer, the process waits at step 267 until the context is changed. When the context is changed, the pixel data is transferred to output control logic 218 in interface portion 103a. At step 268, the pixel data is forwarded to FIFO 220 through output register 222 and onto graphics subsystem bus 19, where it is forwarded to frame buffer subsystem 20 for storage in frame buffer memory 22a or 22b, depending upon the address of the window associated with the pixel data.

Figure 8:
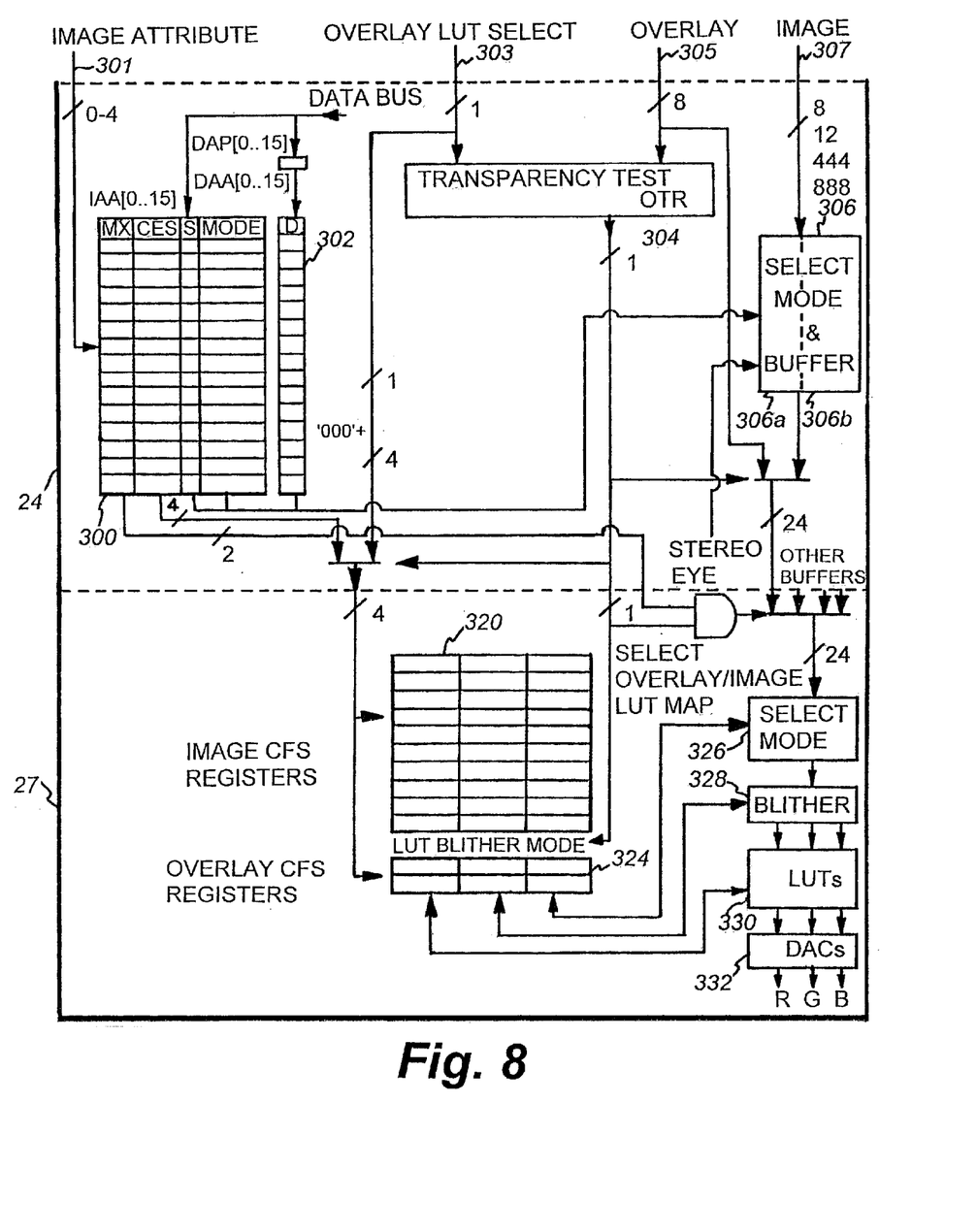
FIG. 8 is a block diagram illustrating the components used within a windowing device of the graphics subsystem of FIG. 1 that allows for switching between multiple windows for display.

When the double buffer swap command is invoked the visually displayed portion of the frame buffer is changed such that the window displays pixels generated by graphics device 102 rather than the previous frame generated by the graphics subsystem 9. Referring now to FIG. 8, a block diagram of the windowing control system included in each of the frame buffer controllers (such as frame buffer controller 24) of frame buffer subsystem 20, is shown coupled to the window display logic of RAMDAC 27. The pixel data stored for each pixel in the frame buffer includes an image attribute 301, an overlay Look Up Table (LUT) select 303, an overlay field 305 and pixel image data 307. Image attribute 301 is used to address an Image Attribute Active (IAA) map 300. IAA map 300 stores pixel configuration and Look Up Table information for pixels having the associated image attribute. Pixel configuration information may include pixel format information such as how many pixels are used to store Red, Green and Blue color information and in what order the color information is received from the frame buffer. The Look Up Table information indicates which Colormap Function Select (CFS) register should be used for addressing window control information in the RAMDAC. Also addressed by image attribute 301 is a Double buffer Active Attribute (DAA) map 302. DAA map 302 stores one bit value for selecting which one of a pair of buffers provides data displayed in the active window.

Frame buffer controller 24 also includes a transparency test block 304 that receives overlay LUT select 303 and overlay information 305. The frame buffer 20 contains two sets of pixel values per pixel. One set is an overlay filed, while one set is the image field. Transparency test block 304 evaluates the overlay fields received with the pixel to determine whether the overlay pixel values are to be displayed or whether the image pixel values are to be displayed.

Frame buffer controller 24 also includes a buffer unit 306 apportioned into two sections, 306a and 306b. Buffer unit 306 temporarily stores the image data as it is received from coupled frame buffer memory in one of the portions 306a or 306b before forwarding it to the RAMDAC for display. The other portion of the buffer unit (i.e., either 306b or 306a, respectively) is used to store the image that is currently being displayed. Because images are received in portions, the use of the double buffer allows for one image to accumulate in one of the portions of the buffer while the other image is being displayed, thereby preventing the display of a partial image. When a full image is accumulated in the other portion of the buffer, the RAMDAC transitions to display the image from the other portion of the buffer. The selection as to which portion of the buffer is being used for the display is controlled by the state of a corresponding bit in the DAA register. Buffer unit 306 additionally receives attribute information for each pixel from IAA map 300 and stores it along with the pixel for transfer to the RAMDAC.

The RAMDAC includes a Color Function Select (CFS) map 320 and overlay Color Function Select (CFS) registers 324. CFS map 320 stores information about the format of the image pixel and identifies one of a number of Look Up Tables (LUTs) 330 that will be used to display the pixel. Similarly, CFS registers 324 store address information for selecting one of the LUTs that is to be forwarded the overlay information.

The LUTs 330 are basically content-addressable memory devices that are addressed using the digital Red, Green and Blue pixel values. The LUTs output a digital representation of an analog signal that corresponds to the desired color indicated by the digital pixel value used to address the LUT. By modifying the contents of the entries in the LUTs, the correspondence between a given input digital pixel value and the representative analog color value may be changed. Accordingly, the digital pixel color/analog color relationship may be redefined for each of the windows that are generated by different applications (or by different graphics devices). The formats and colors of the pixels may be changed for each window by selecting different IAA and DAA values. Selecting different IAA and DAA values results in a selection of different CFS and consequently a LUT for displaying data on the display device.

The double buffered swap command, issued by graphics device 102 causes the windowing system to transition to display the contents of the portion of the double buffer that is not currently being displayed, i.e., the buffer that has accumulated a new image. The double buffered swap command may change the visibly displayed buffer by writing to one of DAA registers 302. Thus, windowing data from graphics device 102 may be accumulated in one portion of the double buffer while windowing data from the base graphics system is being displayed from the other portion of the double buffer. The execution of the double buffer command results in a seamless transitioning in the display between the generated images without incurring visual artifacts as a result of the transition.

An alternative method of switching between windows using the double buffered swap command is to have the double buffered swap command result in a reload of values that point to IAA map 300. By using this method, the pixel format and LUT configurations may be reconfigured before the pixel data associated with the window provided by the graphics device is processed. Regardless of which method is used to transition between windowing system, it can be seen that the use of the double buffer swap command provides a smooth transition between images stored in different portions of the double buffer, regardless of which graphics system generated the images.

Although the embodiment of FIG. 1 illustrates a separate interface pair being used for the host interface functionality and the pixel interface functionality, it is envisioned that the embodiment may be modified to include only one interface pair (for example interface pair 105c and 105d). The interface pair would be capable of operating in either a pixel operation mode or in a host interface operation mode. Pixel data would be forwarded in pixel mode as described above. When operating in host interface mode, host commands would be deposited on bus 19, and transferred using the bus protocol to the host interface 16a to allow for communication between the host and the external graphics device.

Accordingly, a method and apparatus for coupling a high performance graphics device to a base graphics subsystem of a workstation has been described. A first pair of interfaces is provided in both the graphics device and the graphics subsystem for transferring data between the graphics device and the graphics subsystem. A second pair of interfaces couples the graphics device directly to a host interface, for transferring commands between the host processor and the graphics device. In one embodiment, all of the interfaces are identically formed, with different portions of the interface being utilized depending upon the location and function of the interface chip. Alternatively, different interfaces also could be provided. The bus structure of the graphics subsystem provides a high speed interconnect to allow one or more external interface chips to be coupled before and accordingly share a common frame buffer. Because the bus structure of graphics subsystem 9 is a ring bus structure, the addition of one or more external graphics devices has minimal impact on the base graphics subsystem performance, yet allows for additional windowing system to be seamlessly integrated with the base graphics system. With such an arrangement, multiple graphics windowing systems may render pixel data to a common frame buffer memory without incurring degrading visual artifacts of the prior art.

Although graphics device 102 described herein uses a pixel flow architecture, the above-described techniques may alternatively be used with other high performance graphics architectures, with the design of the interface being adjusted according to the communication protocol of the selected graphics architecture. In addition, although the embodiment has been shown with only one interface coupling one graphics device, the invention is not limited to such an arrangement, but is meant to include arrangements wherein multiple graphics devices are coupled the graphics subsystem to share a common frame buffer. Furthermore, the present invention is not be limited to a method for providing a graphics interface, but could be extended to provide a method for interfacing any high performance device into an existing bus system while incurring minimal bus performance delays.

Having thus described at least one illustrative embodiment of the invention, various alterations, modifications and improvements will readily occur to those skilled in the art. Such alterations, modifications and improvements are intended to be within the spirit and scope of the invention.

Accordingly, the foregoing description is by way of example only and is not intended as limiting. The invention is limited only as defined in the following claims and the equivalents thereto.

What is claimed is:

1. A method for interfacing an external three-dimensional, high performance graphics device to a three-dimensional, high performance graphics subsystem of a host workstation, the graphics subsystem comprising a front end graphics rendering subsystem and a frame buffer memory for storing pixels to be provided to an attached display device for display, the method comprising the step of:

providing a first interface coupled between the front end subsystem and the frame buffer memory of the graphics subsystem;

providing a high speed link between the first interface and the external graphics device to communicate between the first interface and the external graphics device; and receiving at the first interface three-dimensional pixel data from the front end subsystem and from the external graphics device for selective storage in the frame buffer memory and display on the display device, wherein the front end subsystem, first interface and frame buffer memory are connected via a ring bus.

2. The method according to claim 1, further comprising the step of:

transmitting a display list to the external graphics device, the display list generated by a processor coupled to the first interface and defining at least one image to be rendered by the external graphics device.

3. The method according to claim 1, further comprising the step of coupling the first interface to the frame buffer by a dedicated bus.

4. The method according to claim 1, further comprising the step of providing a second interface, coupled to the graphics device, for transferring host command data between the host workstation and the graphics device.

5. The method according to claim 4, wherein the graphics device further comprises a third interface coupled to a graphics multi-processor and to the first interface, and wherein the step of receiving further comprises the steps of:

transmitting, from the second interface to the first interface, region data received from the graphics multi-processor descriptive of a region associated with the pixel data generated by the graphics device;

transmitting, from the third interface to the first interface, the pixel data from the graphics device; and issuing, by the second interface in response to a command from the graphics multi-processor, a command to host workstation indicating that the pixel data is ready for storage in the frame buffer.

6. A dedicated bus interface for coupling a three-dimensional, high performance graphics rendering device to a three-dimensional, high performance graphics rendering subsystem in a host workstation, the graphics rendering subsystem comprising a graphics processor and a frame buffer memory connected to the bus interface via a ring bus, the bus interface being disposed between the graphics processor and the frame buffer memory and comprising:

a first datapath, for receiving first three-dimensional pixel data from the graphics processor;

a second datapath, for receiving second three-dimensional pixel data from the graphics device; and a third datapath, for forwarding either the first pixel data or the second pixel data to the frame buffer memory for storage.

7. The bus interface according to claim 6, wherein the bus interface operates in a host mode for transferring commands between the graphics rendering subsystem and the graphics device and a pixel mode for receiving the second pixel data from the graphics rendering device, and wherein the bus interface further comprises a writeable register for indicating a mode of operation of the bus interface.

8. A graphics subsystem comprising:

a high performance graphics rendering processor for providing first three-dimensional pixel data;

a frame buffer memory for storing display pixel data to be displayed on an attached display device; and a first bus interface disposed between the graphics processor and the frame buffer, and connected to the graphics processor and the frame buffer via a ring bus, the first bus interface adapted to receive the first three-dimensional pixel data from the graphics processor and second three-dimensional pixel data from an external high-performance graphics rendering device, and to forward either the first pixel data or the second pixel data to the frame buffer memory for storage as display pixel data.

9. The graphics subsystem according to claim 8, wherein the graphics processor is coupled to the first bus interface by a first dedicated bus, and wherein the first bus interface is coupled to the frame buffer memory by a second dedicated bus, and wherein the first bus interface further comprises:

a first datapath, for forwarding data from the first dedicated bus to the second dedicated bus; and a second datapath, coupled to the first datapath and to the external graphics device, for transmitting pixel data received from the external graphics device to the second dedicated bus.

10. The graphics subsystem according to claim 9, wherein the first bus interface further comprises a third datapath, coupled to the first datapath and to the graphics device, for transmitting command data received from the graphics processor to the graphics device.

11. The graphics subsystem according to claim 9, wherein the first bus interface operates in a host mode for transferring commands between the graphics subsystem and the external graphics device and a pixel mode for receiving pixel data from the external graphics device, and wherein the first bus interface further comprises a writeable register for indicating a mode of operation of the first bus interface.

12. The graphics subsystem according to claim 8, further comprising:

a second bus interface, disposed between the host workstation and the graphics device, wherein the first bus interface operates to transfer pixel data to the host workstation and wherein the second interface operates to transfer commands to and from the host workstation.

13. A workstation comprising:

a host processor;

a high performance, three-dimensional graphics subsystem, coupled to the host processor, the graphics subsystem comprising:

a graphics processor;

a first interface, coupled to the graphics processor;

a frame buffer memory, coupled to the first interface, wherein the graphics processor, first interface and frame buffer memory are connected via a ring bus; and a high performance, three-dimensional graphics rendering device, coupled to the first interface of the graphics subsystem, the graphics device comprising:

a graphics multi-processor, for generating pixel data for display on a display device of the workstation; and a second interface, for forwarding the pixel data from the graphics multi-processor to the first interface of the graphics subsystem, wherein the first interface forwards the pixel data received from the second interface to the frame buffer memory for storage.

14. The workstation according to claim 13, wherein the graphics processor is coupled to the first interface by a first dedicated bus, and wherein the first interface is coupled to the frame buffer memory by a second dedicated bus.

15. The workstation according to claim 14, wherein the first interface further comprises:

a first datapath, coupled to the graphics processor and the second dedicated bus, for forwarding pixel data generated by the graphics processor from the first dedicated bus to the second dedicated bus; and a second datapath, coupled to the first datapath and to the graphics device, for transmitting pixel data received from the graphics device to the second dedicated bus coupled to the frame buffer memory.

16. The workstation according to claim 13, further comprising:

a third interface device, disposed between the host processor and the graphics device, wherein the third interface is used to transfer command data between the host processor and the graphics device, and wherein the second and first interfaces are used to transfer command and pixel data between the host processor and the graphics device.

17. A graphics system comprising:

a first high performance, pipelined, three-dimensional graphics rendering subsystem including a front end processor and a frame buffer, the front end processor producing first three-dimensional pixel data;

a second high performance, pipelined, three-dimensional graphics rendering subsystem that produces second three-dimensional pixel data;

an interface coupled between the front end processor and the frame buffer of the first graphics rendering subsystem; and a high speed data link coupled between the interface and the second graphics rendering subsystem;

wherein the interface receives the first three-dimensional pixel data from the front end processor of the first graphics rendering subsystem and the second three-dimensional pixel data from the second graphics rendering subsystem and selectively stores the first and second pixel data in the frame buffer, wherein the front end processor, interface and frame buffer are connected with a ring bus.

18. The system claimed in claim 17 wherein the second graphics rendering subsystem is a device external to the first graphics rendering subsystem.

* * * * *